United States Patent Office 3,698,913
Patented Oct. 17, 1972

3,698,913
TREATMENT OF DISTILLED ALCOHOLIC LIQUORS
Theodore Malinin, Alexandria, Va.
(360 Atlantic Road, Key Biscayne, Fla. 33149)
No Drawing. Filed Sept. 11, 1970, Ser. No. 71,393
Int. Cl. C12f 1/00; C12g 3/12
U.S. Cl. 99—34
5 Claims

ABSTRACT OF THE DISCLOSURE

A method for improving and mellowing the taste of alcoholic distilled liquors and for bringing about a shift in the pH value toward the neutral range, by reducing the total ester content and total fusel oil content, involves intimately contacting the liquor with a gaseous mixture of oxygen and carbon dioxide in which the percent of carbon dioxide by volume is in the range from about 5% to about 15%.

BACKGROUND OF THE INVENTION

The present invention is concerned with a novel method for improving and mellowing the taste of alcoholic distilled liquors and for bringing about a shift in the pH value of the untreated liquor toward the neutral range.

Distilled liquors, such as whisky, which are either freshly produced or which have been stored or aged only a short time, include, in addition to their ethanol content, flavor constituents designated as congeners. These congeners are generated together with ethanol during fermentation of the grain, and also in the course of subsequent storage. The congeners include aliphatic aldehydes, both saturated and unsaturated, heterocyclic aldehydes, ketones, higher alcohols, and organic acids. These compounds impart harshness and adversely affect taste of the liquors, and produce pH values in the liquor ranging from fairly strongly acid to quite alkaline, which represent a pungency beyond tolerance of consumers.

Customarily, distilled liquors are stored or matured in oak casks having internal charred staves and heads, sometimes for as many as 8 or 10 years. During this period, there may take place additional chemical reactions, including oxidation of alcohols to aldehydes, aldehydes to acids, reactions between organic compounds present, and extraction of additional compounds from the wood of the cask.

Typical congeners which are present in various types of distilled liquors, both raw and matured, include acetaldehyde, acetic acid, fusel oil (mixture of amyl alcohols), furfural, and esters such as ethyl acetate.

The pH values of distilled liquors vary widely, ranging, for example, from an acid value of 4.8 for rum, to an alkaline value of 9.0 for corn whisky.

In the prior art, a great variety of measures have been proposed directed toward improving the taste and accelerating the aging or maturation of alcoholic beverages. These include neutralization of acidity by the addition of alkalis such as milk of lime, to raise the pH value. However, such methods are unsatisfactory in that they require subsequent buffering and require the removal of precipitated insoluble materials. The acceleration of aging by contact with activated carbon has also been proposed.

There have been suggestions in the prior art that distilled liquors could be improved in various respects by treatment with air, or with oxygen gas or nitrogen gas, or mixtures of these gases. These processes have been directed toward volatilization or oxidation of undesirable impurities. However, experience has shown that oxygen treatment per se is inadequate for mellowing and flavor improvement, and such treatment is generally disclosed as requiring supplementation by activated charcoal or high frequency electric discharge.

GENERAL DESCRIPTION OF THE INVENTION

In accordance with the present invention, there is provided a novel method for the gaseous treatment of distilled liquors whereby a rapid improvement and mellowing of taste is brought about, as well as a shift in the pH of the liquor toward the neutral range.

The method of the invention comprises intimately contacting the liquor with a gaseous mixture of oxygen and carbon dioxide in which the percent of carbon dioxide by volume is in the range from about 5% to about 15%, preferably about 10%.

The time of treatment is not critical, but should be of sufficient duration to bring about the desired alteration in the pH of the liquor toward the neutral range. For the purposes of flavor improvement and mellowing, such neutral pH range will generally lie between about 5 and about 8.

Treatment time will depend upon the type of liquor being treated, the types of congeners present, the acidity or alkalinity pH values, and the like, but from about ¼ to about 3 hours will suffice for most liquors.

Distilled liquors which are amenable to the method of the invention include, for example, various whiskies, such as bourbon, rye, scotch, blended whiskies, cognac, brandy, and rum, but this listing is not to be regarded as limiting the applicability of the method of the invention thereto.

While high purity oxygen may be used for treatment purposes together with carbon dioxide in accordance with the invention, the commercial grades available for welding or metal treatment may be satisfactorily utilized.

The mixture of oxygen and carbon dioxide is preferably introduced into intimate contact with the distilled liquor in the form of fine bubbles or microbubbles. These are obtainable by passing the gas mixture through small bore tubing having an inside diameter in the range of about 1 mm. to about 2 mm., under a pressure of at least about 20 pounds per square inch. Gas mixture bubbles of the desired fineness may also be obtained by passing the mixture under pressure through a solid porous material, such as an unglazed porous ceramic filter. Under these conditions, the gas mixture bubbles produce an agitation or "boiling" effect on the liquor as it is being heated, and a treatment time of only about 15 to 20 minutes will produce the desired improvement.

The treatment is satisfactorily performed at ordinary temperature. The alcoholic content of the liquors is not substantially altered by the treatment, but there is a reduction in the total water content and the total fusel oil content.

The improvement in flavor and taste appears to be permanent, and such improved flavor showed retention in treated distilled spirits tested for periods up to one year after treatment.

The intimate contact of the liquor with the gas stream may also be obtained by exposure of the liquid on rotating discs to the gaseous atmosphere, or by passing the liquid over a bed of glass or ceramic beads in a chamber, or by exposure of the liquid to the gaseous mixture through a semipermeable membrane.

DESCRIPTION OF THE PREFERRED EMBODIMENTS

The following examples serve to illustrate the practice of the method of the invention, but are not to be regarded as limiting:

Example 1

A liter of corn whisky having a pH value of 9.0 was treated at room temperature (70° F.) for 2 hours with a stream of fine bubbles of a gaseous mixture of oxygen containing 10% by volume of carbon dioxide, the gas mixture being passed through a porous ceramic filter. At the end of the treatment period, the pH had been reduced to 7.6, and the harshness in taste was gone. The pH value and improved taste remained stable on subsequent testing at monthly intervals for one year.

Example 2

500 cc. of rum having a pH of 4.8 were treated with the same gaseous mixture as described in Example 1. At the end of 2 hours treatment, the pH of the rum was 5.6, and a smooth taste and improved flavor had resulted.

Example 3

100 cc. of new bourbon whisky were treated with a mixture of oxygen and 10% carbon dioxide by passing the gaseous mixture into the whisky through 4 glass tubes having an inside diameter of 1 mm., under a pressure of 25 pounds per square inch, for a period of 20 minutes. At the end of the treatment, samples of the untreated and treated whisky where measured using Schiff's reagent (a solution of 0.25 gm. of fuchsine in 1 liter of water which has been decolorized with sulfur dioxide) and reading the percent transmission and optical density in a colorimeter in diluted samples in 10 minutes following the addition of the reagent. The optical density in an untreated sample of the whisky was 0.1, while after treatment it was 0.02. The percent transmission of the untreated whisky was 0.79, while that of the treated product was 0.95.

The following table shows a comparative analysis of the treated and untreated bourbon whisky:

TABLE.—ANALYSIS OF TREATED AND UNTREATED BOURBON WHISKEY

|  | Untreated | Treated |
|---|---|---|
| Color index | 14.0 | 18.0 |
| Ethyl alcohol content | 45 | 42 |
| Total acid | 77.5 | 86.8 |
| Fixed acid | 13.3 | 11.5 |
| Volatile acid | 64.2 | 75.3 |
| Ethyl acetate | 53.8 | 4.4 |
| N-propyl alcohol | 11.9 | 9.9 |
| Isobutyl alcohol | 40.3 | 33.1 |
| Isoamyl alcohol | 135.8 | 114.5 |
| Total fusel oil | 188.0 | 157.5 |

The substantial decrease in ester (ethyl acetate) and total fusel oil content in the treated product will be apparent from the data in the table.

What is claimed is:

1. Method for mellowing and improving the flavor of an alcoholic distilled liquor consisting essentially of treatment of said liquor by intimately contacting said liquor for a period sufficient to substantially reduce the ethyl acetate content in the liquor with a gaseous mixture consisting essentially of oxygen and carbon dioxide in which the percent of carbon dioxide by volume is in the range from about 5% to about 15%, said gaseous mixture being in the form of fine bubbles and the alcoholic content of said liquor being substantially unchanged by said treatment.

2. The method of claim 1 in which the proportion of carbon dioxide is about 10% by volume.

3. The method of claim 1 in which said gaseous mixture is applied at ambient temperature.

4. The method of claim 1 in which the period of treatment is between about ¼ and about 3 hours.

5. The method of claim 1 in which the treatment with said gaseous mixture is continued until the liquor attains a pH value in the range of about 5 and about 8.

References Cited

UNITED STATES PATENTS

| 2,108,030 | 2/1938 | Darrah | 99—49 X |
| 2,637,652 | 5/1953 | Ryan | 99—48 |

OTHER REFERENCES

Herstein, et al., Chemistry and Technology of Wines and Liquors, D. Van Nostrand Co., Inc., New York, 1948 (pp. 142–145 and 148–151).

A. LOUIS MONACELL, Primary Examiner

D. M. NAFF, Assistant Examiner

U.S. Cl. X.R.

99—48